(12) United States Patent
Porter et al.

(10) Patent No.: US 9,170,414 B2
(45) Date of Patent: Oct. 27, 2015

(54) METHOD AND APPARATUS FOR PRODUCING A SUPER-MAGNIFIED WIDE-FIELD IMAGE

(71) Applicants: Jeffrey Porter, Gilbert, AZ (US); Cheryl Watkins, Gilbert, AZ (US)

(72) Inventors: Jeffrey Porter, Gilbert, AZ (US); Cheryl Watkins, Gilbert, AZ (US)

(73) Assignee: Yancy Corp., Peoria, AZ (US)

( * ) Notice: Subject to any disclaimer, the term of this patent is extended or adjusted under 35 U.S.C. 154(b) by 227 days.

(21) Appl. No.: 14/092,428

(22) Filed: Nov. 27, 2013

(65) Prior Publication Data
US 2014/0240823 A1   Aug. 28, 2014

Related U.S. Application Data

(60) Provisional application No. 61/770,110, filed on Feb. 27, 2013.

(51) Int. Cl.
| | |
|---|---|
| G02B 21/36 | (2006.01) |
| G02B 21/02 | (2006.01) |
| G02B 21/04 | (2006.01) |
| G02B 21/00 | (2006.01) |
| G02B 27/58 | (2006.01) |
| G02B 21/22 | (2006.01) |
| G02B 21/06 | (2006.01) |
| G02B 23/24 | (2006.01) |

(52) U.S. Cl.
CPC ............ *G02B 21/02* (2013.01); *G02B 21/0052* (2013.01); *G02B 21/04* (2013.01); *G02B 21/365* (2013.01); *G02B 27/58* (2013.01); *G02B 21/06* (2013.01); *G02B 21/22* (2013.01); *G02B 23/2446* (2013.01)

(58) Field of Classification Search
None
See application file for complete search history.

(56) References Cited

U.S. PATENT DOCUMENTS

| | | | | |
|---|---|---|---|---|
| 5,729,385 A | * | 3/1998 | Nishida | G02B 21/00 359/368 |
| 8,040,596 B2 | * | 10/2011 | Mizusawa | G02B 21/082 359/379 |

* cited by examiner

*Primary Examiner* — Stephone B Allen
*Assistant Examiner* — Balram Parbadia
(74) *Attorney, Agent, or Firm* — Hartman Titus PLC; John D. Titus

(57) ABSTRACT

A wide-field optical microscope and method capable of resolving images down to 0.1 Å with a magnification range in excess of 250 million power includes an objective having a primary and a secondary element. A sample is held so that the area of interest is at a location that is closer to the primary element than the focal length of the primary element. The primary element collects and collimates light reflected from the sample. The secondary element then focuses the collimated light onto a pinhole aperture, which blocks all light rays that were not parallel, thus producing a non-focused reflected pattern. The non-focused reflected pattern passes through a field stop and is then magnified by one or more negative optical elements and additional field stops to produce an enlarged pattern.

8 Claims, 4 Drawing Sheets

METHOD AND APPARATUS FOR PRODUCING A SUPER-MAGNIFIED WIDE-FIELD IMAGE

BACKGROUND OF THE INVENTION

This invention relates generally to optical microscopy and in particular to reflected-light (epi-illumination) wide-field microscopy.

In a conventional non-scanning (wide-field) optical microscope, radiation (typically visible light, ultraviolet light or x-rays) interacts (e.g. by reflection, refraction, or diffraction) with a specimen located at the object plane of the microscope optics, to create a pattern that is processed by the microscope to create an image that is enlarged to a size that is many times greater than the specimen itself. In a conventional reflected-light wide-field compound refractive microscope, radiation reflected from the specimen passes through an objective that focuses the radiation into an enlarged real image on an intermediate image plane. The intermediate image is then additionally magnified by an eye lens which produces an enlarged real or virtual image depending on the particular application.

It is well-know that at very high magnifications optical microscopes will exhibit the characteristic that point objects are seen as fuzzy disks surrounded by diffraction rings. The resolving power of a microscope is taken as the ability of the microscope to reveal adjacent structural detail as distinct and separate. Even assuming perfect refraction by the lens system of the microscope, the minimum size of the diffraction rings, which determines the resolution (d) of the microscope is still limited function by both the wavelength of light ($\lambda$), and the numerical aperture (NA) of the objective lens as expressed by the following equation.

$$d = \frac{\lambda}{2NA}$$

In practice, the highest numerical aperture that can be achieved in air is about 0.95. Therefore and with green light (about 550 nm wavelength) the diffraction limit of a conventional optical microscope is about 200 nm (the Abbe Limit).

Numerous methods have been successfully employed over the years in order to gain ever increasing magnification and resolution, including use of ultraviolet light and x-rays (shorter wavelength) and oil immersion (increased numerical aperture). These methods, however, are still limited by the Abbe limit of the optical system. A technique for increasing resolution beyond the Abbe limit of an optical system is laser scanning confocal microscopy. In a laser confocal microscope, a laser beam passes through a light source pinhole aperture and beam splitter and is focused by an objective lens onto the specimen. The light reflected from the specimen is focused through the objective lens onto the beam splitter, which reflects the light onto a photo-detector through a pinhole aperture. The pinhole aperture blocks any reflected light that is not emanating from the focal point of the objective (which would be out of focus). Laser confocal microscopes operate above the Abbe limit of the optical system but do not produce a wide-field image. Consequently the image must be constructed by scanning the sample point by point.

SUMMARY OF THE INVENTION

What is needed therefore and what the prior art lacks is an apparatus and method for producing a wide-field image that is capable of magnification and resolution far in excess of the Abbe limit of the optical system. The present invention satisfies the foregoing need by providing a wide-field optical microscope and method capable of resolving images down to 0.1 Å with a magnification range in excess of 250 million power. According to an illustrative embodiment of the invention, the microscope includes an objective having a primary and a secondary element. A sample is held so that the area of interest is at a location that is closer to the primary element than the focal length of the primary element. The primary element collects and collimates light reflected from the sample. The secondary element then focuses the collimated light onto a pinhole aperture, which blocks all light rays that were not parallel, thus producing a non-focused reflected pattern. The non-focused reflected pattern passes through a field stop and is then magnified by one or more negative optical elements and additional field stops to produce an enlarged pattern which can be displayed on a screen or subjected to additional processing to produce a positive image of the sample.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
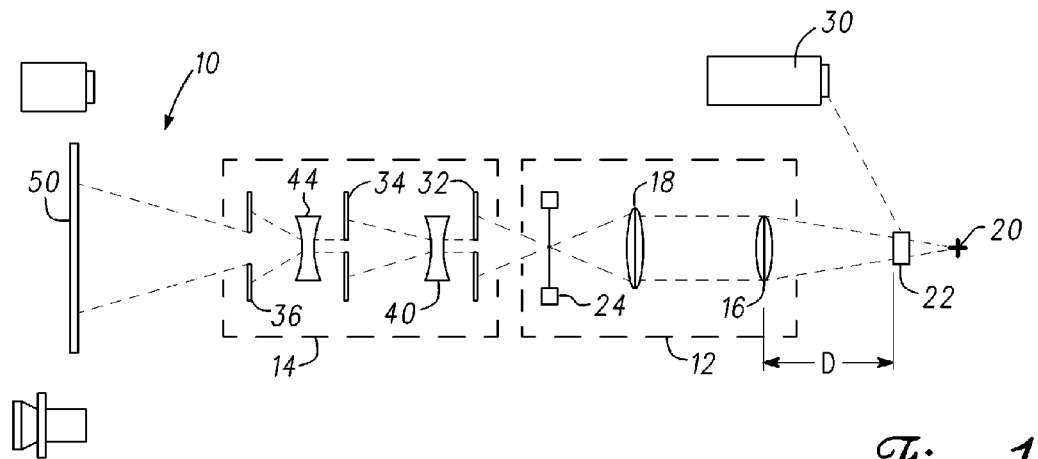
FIG. 1 is a schematic view of a microscope incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to the figures and in particular to FIG. 1, a microscope 10 incorporating features of the present invention comprises a primary magnification stage 12 and a secondary magnification stage 14. Primary magnification stage 12 comprises a first optical element comprising a first lens 16 and a second optical element comprising a second lens 18. As discussed more fully hereinafter, although the illustrative embodiment of FIG. 1 incorporates refractive elements, equivalent reflective elements may be incorporated into the apparatus without departing from the scope of the invention. Accordingly, as used herein, optical elements means and refers both to reflective and refractive optical elements.

Figure 2:
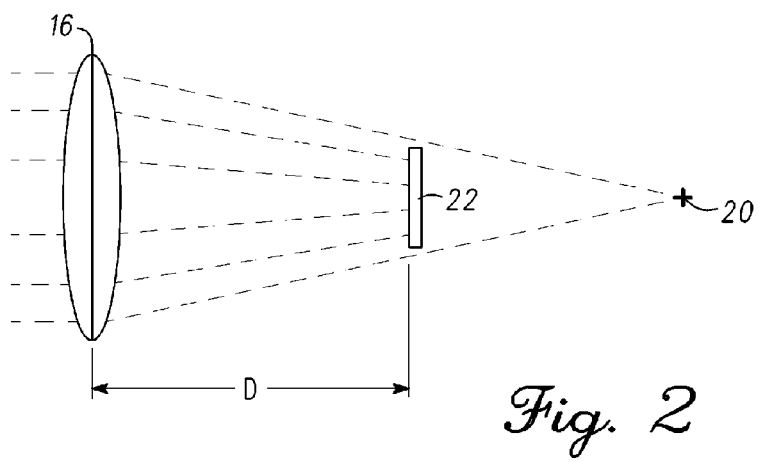
FIG. 2 is an enlarged view of a portion of the microscope of FIG. 1.
Figure 3:
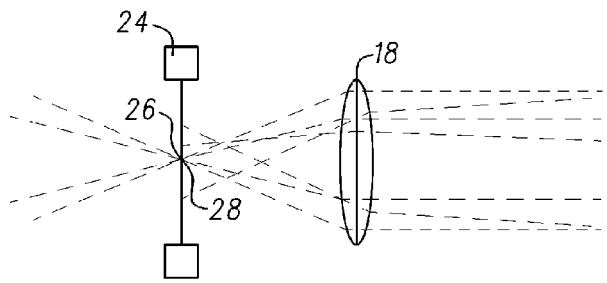
FIG. 3 is an enlarged view of another portion of the microscope of FIG. 1.

First optical element 16 has a focal point 20, which is the single point at which collimated light entering first optical element 16 is focused. Microscope 10 further includes means for supporting a specimen 22. As shown in FIG. 2, means for supporting specimen 22 is configured so that the specimen is located at a distance "D" which is less than the distance from first optical element 16 to focal point 20. Means for supporting specimen 22 may be any conventional microscope specimen support, platten or other stable movable support and therefore the invention should not be considered as limited to any particular support.

Primary magnification stage 12 further comprises a primary stage field stop 24 which comprises a pinhole aperture 26 located at the focal point 28 of second optical element 18. As can be determined from the foregoing, light from a light source 30 is reflected off of a specimen located on specimen support 22. That portion of the reflected light which is parallel to a corresponding ray emanating from focal point 20 is collimated by first optical element 16. The collimated light then passes through secondary optical element 18 which focuses the light onto primary stage field stop 24. Pinhole aperture 26 blocks all light that is not is parallel to the optical axis between the primary optical element 16 and primary optical element 18. Light source 30 can be any source of illumination in the electromagnetic spectrum from infrared, to visible, to ultraviolet, to x-rays and may be coherent or non-coherent, polarized or non-polarized from any number of sources including LEDs, lasers, arc lamps, incandescent lamps or any other source of electromagnetic radiation.

As can be determined from the foregoing, since the sample surface is always closer to the first optical element 16 than the distance to its focal point 20 (i.e. the sample is always within the focal cone of first optical element 16), the reflected image is not a focused image in the classical sense but is a reflected pattern of the sample surface. The distance from the sample to the first optical element 16 determines the magnification. The closer to the first optical element 16 the sample is, the lower the magnification and the closer to the focal point of the first optical element 16 the higher the magnification. The larger the physical dimension (diameter) of the first optical element 16, and the smaller the focal spot size, the higher the magnification (as opposed to a conventional microscope in which magnification is determined by the half angle of the focal cone). In practice, magnification of the primary magnification stage of the present invention can be up to 100,000× power.

Figure 4:
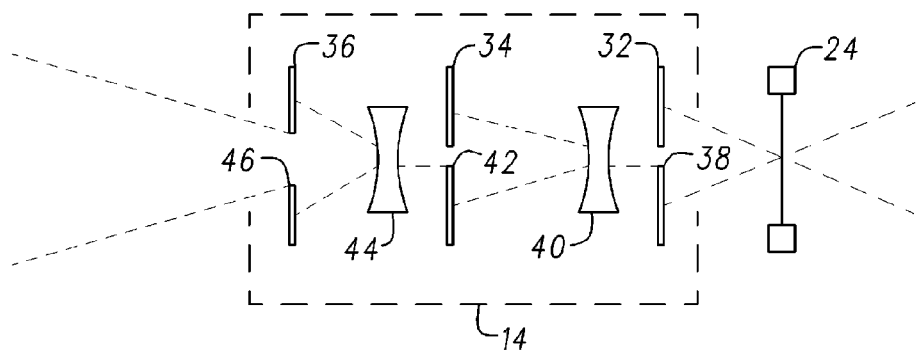
FIG. 4 is an enlarged view of yet another portion of the microscope of FIG. 1.

With additional reference to FIG. 4, in the illustrative embodiment, secondary magnification section 14 comprises a first secondary stage field stop 32, a second secondary stage field stop 34 and a third secondary field stop 36. Light passing through pinhole aperture 26 of primary stage field stop 24 impinges first secondary stage field stop 32 where all but all but that portion of the light passing through field stop aperture 38 is blocked. The portion of light that passes through field stop aperture 38 then passes through third optical element 40, which in the illustrative embodiment is a double concave lens or similar negative optical element, which causes the light to diverge until it impinges second secondary stage field stop 34. Second secondary field stop 34 blocks all but that portion of light passing through field stop aperture 42.

That portion of light passing through field stop aperture 42 then passes through fourth optical element 44, which in the illustrative embodiment is a double concave lens or similar negative optical element, which causes the light to diverge until it impinges third secondary stage field stop 36. Third secondary field stop 36 blocks all but that portion of light passing through field stop aperture 46. Light exiting through field stop aperture 46 then forms a pattern on display means 50 which in the illustrative embodiment of FIG. 1 is a view screen. Although in the illustrative embodiment, display means 50 is a view screen, any conventional apparatus for viewing a light pattern including a CCD camera, or conventional microscope eyepiece may be incorporated without departing from the scope of the present invention and therefore the invention should not be considered as limited to any particular display means.

Figure 5:
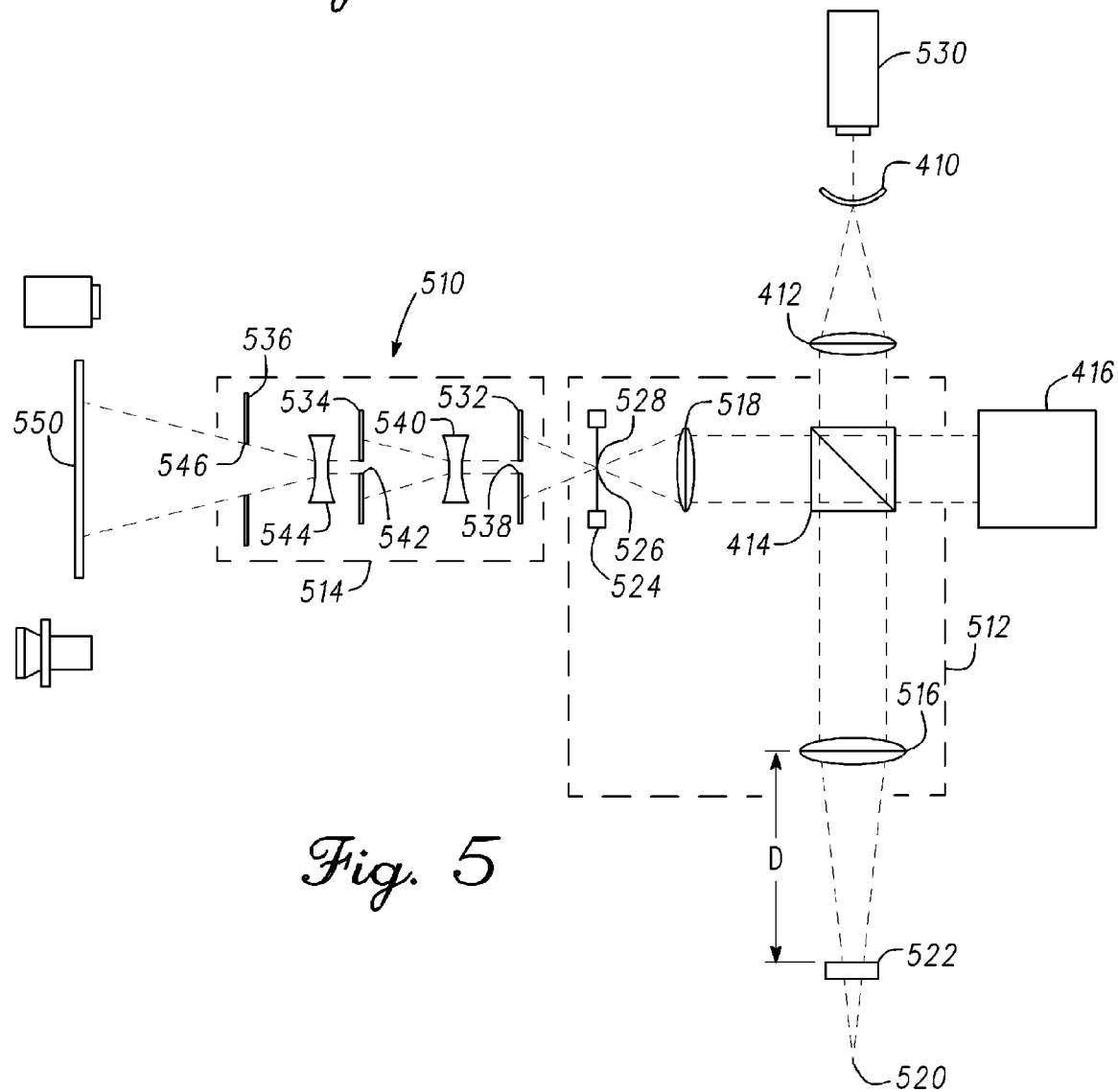
FIG. 5 is a schematic view of an alternative embodiment of a microscope incorporating features of the present invention.

With additional reference to FIG. 5, in an alternative embodiment microscope 510 comprises a primary magnification stage 512 and a secondary magnification stage 514. Primary magnification stage 512 comprises a first optical element comprising a first lens 516 and a second optical element comprising a second lens 518. First optical element 516 has a focal point 520, which is the single point at which collimated light entering first optical element 516 is focused. Microscope 510 further includes means for supporting a specimen 522 so that the specimen is located at a distance "D" which is less than the distance from first optical element 516 to focal point 520.

Primary magnification stage 512 further comprises light focusing elements 410 and 412, a non-polarizing beam splitter 414, a light absorber 416, and a primary stage field stop 524 which comprises a pinhole aperture 526 located at the focal point 528 of second optical element 518. As can be determined from the foregoing, light from a light source 530 passes through light focusing elements 410 and 412 which collimate the light from light source 530 and direct the light onto non-polarizing beam splitter 414. A portion of the light passing through non-polarizing beam splitter 414 is focused on to specimen 522 which is positioned within the focal cone of first optical element 516. That portion of the light reflected off of specimen 522 which is parallel to a corresponding ray emanating from focal point 520 is collimated by first optical element 516. The collimated light then passes through non-polarizing beam splitter 414 and a portion is directed onto secondary optical element 518. Secondary optical element 518 focuses the light onto primary stage field stop 524. Pinhole aperture 526 blocks all light that is not is parallel to the optical axis between the primary optical element 516 and primary optical element 518. The portion of the collimated light passing through non-polarizing beam splitter 414 that is not directed onto secondary optical element 518 is absorbed by light absorber 416.

In the illustrative embodiment of FIG. 5, secondary magnification section 514 comprises a first secondary stage field stop 532, a second secondary stage field stop 534 and a third secondary stage field stop 536. Light passing through pinhole aperture 526 of primary stage field stop 524 impinges first secondary stage field stop 532 where all but all but that portion of the light passing through field stop aperture 538 is blocked. The portion of light that passes through field stop aperture 538 then passes through third optical element 540, which in the illustrative embodiment is a double concave lens or similar negative optical element, which causes the light to diverge until it impinges second secondary stage field stop 534. Second secondary field stop 534 blocks all but that portion of light passing through field stop aperture 542. That portion of light passing through field stop aperture 542 then passes through fourth optical element 544, which in the illustrative embodiment is a double concave lens or similar negative optical element, which causes the light to diverge. Light exiting through field stop aperture 546 then forms a pattern on display means 550.

As noted hereinbefore, although the illustrative embodiment of FIG. 1 incorporated refractive elements, equivalent reflective elements may be incorporated into the apparatus without departing from the scope of the invention. In the illustrative embodiment of FIG. 6, a microscope 610 incorporating features of the present invention comprises a primary magnification stage 612 and a secondary magnification stage 614. Primary magnification stage 612 comprises a first optical element comprising a first off-axis parabolic mirror 616 and a second optical element comprising a second off-axis parabolic mirror 618. First optical element 616 has a focal point 620, which is the single point at which collimated light reflected by first optical element 616 is focused. Microscope 610 further includes means for supporting a specimen 622 so that it is located at a distance "D" which is less than the distance from first optical element 616 to focal point 620.

Primary magnification stage 612 further comprises a primary stage field stop 624 which comprises a pinhole aperture 626 located at the focal point 628 of second optical element 618. As can be determined from the foregoing, light from a light source 630 is reflected off of a specimen 622. That portion of the reflected light which is parallel to a corresponding ray emanating from focal point 620 is collimated by first optical element 616. The collimated light is then reflected by secondary optical element 618 which focuses the light onto primary stage field stop 624. Pinhole aperture 626 blocks all light that is not is parallel to the optical axis between the primary optical element 616 and primary optical element 618.

Figure 6:
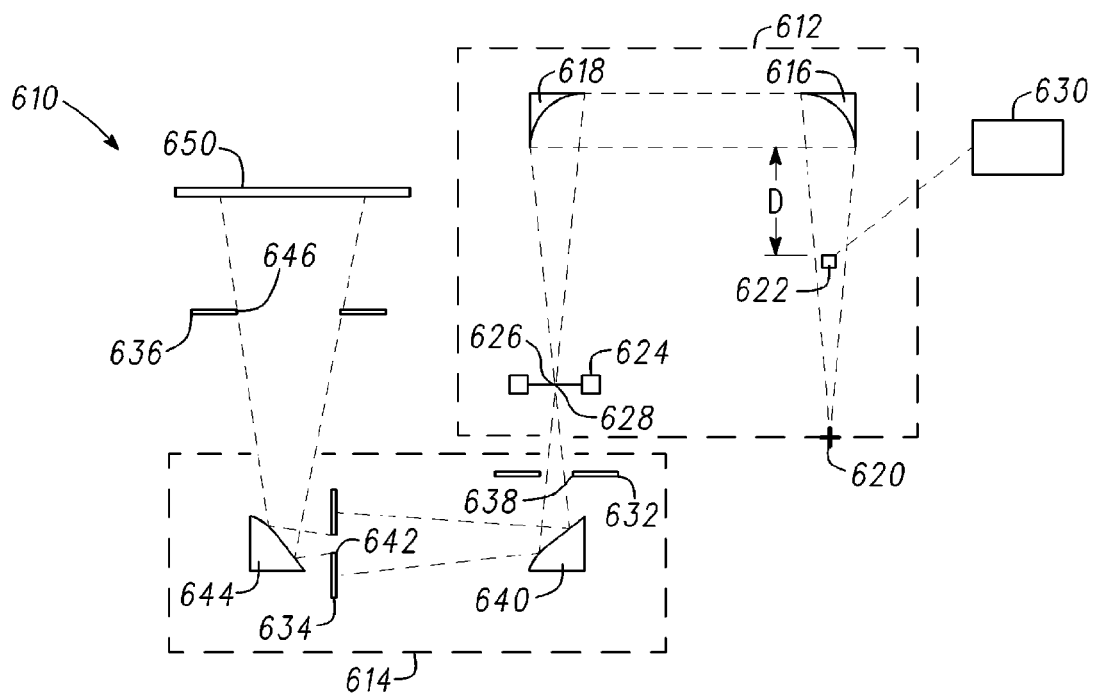
FIG. 6 is a schematic view of another alternative embodiment of a microscope incorporating features of the present invention.

In the illustrative embodiment of FIG. 6, secondary magnification section 614 comprises a first secondary stage field stop 632 and a second secondary stage field stop 634. Light passing through pinhole aperture 626 of primary stage field stop 624 impinges first secondary stage field stop 632 where all but all but that portion of the light passing through field stop aperture 638 is blocked. The portion of light that passes through field stop aperture 638 is then reflected by third optical element 640, which in the illustrative embodiment is a convex off-axis parabolic mirror or similar negative optical element, which causes the light to diverge until it impinges second secondary stage field stop 634. Second secondary field stop 634 blocks all but that portion of light passing through field stop aperture 642. That portion of light passing through field stop aperture 642 is then reflected by fourth optical element 644, which in the illustrative embodiment is a convex off-axis parabolic mirror or similar negative optical element, which causes the light to diverge until it impinges third secondary stage field stop 636. Third secondary field stop 636 blocks all but that portion of light passing through field stop aperture 646. Light exiting through field stop aperture 646 then forms a pattern on display means 650.

Figure 7:
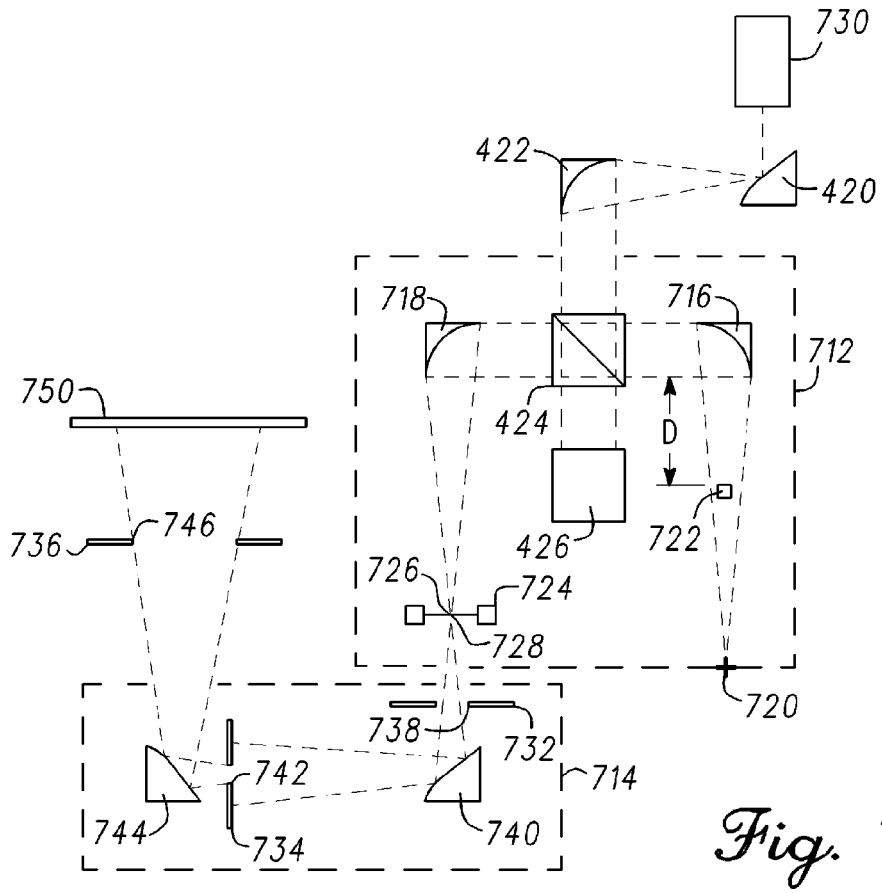
FIG. 7 is a schematic view of yet another alternative embodiment of a microscope incorporating features of the present invention.

With additional reference to FIG. 7, in an alternative embodiment microscope 710 comprises a primary magnification stage 712 and a secondary magnification stage 714. Primary magnification stage 712 comprises a first optical element comprising a first concave off-axis parabolic mirror 716 and a second optical element comprising a second concave off-axis parabolic mirror 718. First optical element 716 has a focal point 720, which is the single point at which collimated light reflected by first optical element 716 is focused. Microscope 710 further includes means for supporting a specimen 722 so that the specimen is located at a distance "D" which is less than the distance from first optical element 716 to focal point 720.

Primary magnification stage 712 further comprises light focusing elements 420 and 422, a non-polarizing beam splitter 424, a light absorber 426, and a primary stage field stop 724 which comprises a pinhole aperture 726 located at the focal point 728 of second optical element 718. As can be determined from the foregoing, light from a light source 730 passes through light focusing elements 420 and 422 which collimate the light from light source 730 and direct the light onto non-polarizing beam splitter 424. A portion of the light passing through non-polarizing beam splitter 424 is focused on to specimen 722 which is positioned within the focal cone of first optical element 716. That portion of the light reflected off of specimen 722 which is parallel to a corresponding ray emanating from focal point 720 is collimated by first optical element 716. The collimated light then passes through non-polarizing beam splitter 424 and a portion is directed onto secondary optical element 718. Secondary optical element 718 focuses the light onto primary stage field stop 724. Pinhole aperture 726 blocks all light that is not is parallel to the optical axis between the primary optical element 716 and primary optical element 718. The portion of the collimated light passing through non-polarizing beam splitter 424 that is not directed onto secondary optical element 718 is absorbed by light absorber 426.

In the illustrative embodiment of FIG. 7, secondary magnification section 714 comprises a first secondary stage field stop 732 and a second secondary stage field stop 734. Light passing through pinhole aperture 726 of primary stage field stop 724 impinges first secondary stage field stop 732 where all but all but that portion of the light passing through field stop aperture 738 is blocked. The portion of light that passes through field stop aperture 738 is then reflected by third optical element 740, which in the illustrative embodiment is a convex off-axis parabolic mirror or similar negative optical element, which causes the light to diverge until it impinges second secondary stage field stop 734. Second secondary field stop 734 blocks all but that portion of light passing through field stop aperture 742. That portion of light passing through field stop aperture 742 is then reflected by fourth optical element 744, which in the illustrative embodiment is a convex off-axis parabolic mirror similar negative optical element, which causes the light to diverge until it impinges third secondary stage field stop 736. Third secondary field stop 736 blocks all but that portion of light passing through field stop aperture 746. Light exiting through field stop aperture 746 then forms a pattern on display means 750.

According to an inventive method, specimen 22, 422, 522, 622, 722 is moved away from first optical element 16, 516, 616, 716 in order to increase magnification of the reflected image. Alternatively, the focal length of first optical element 16, 516, 616, 716 is decreased (although still remaining greater than "D") to increase magnification of the reflected image.

Figure 8:
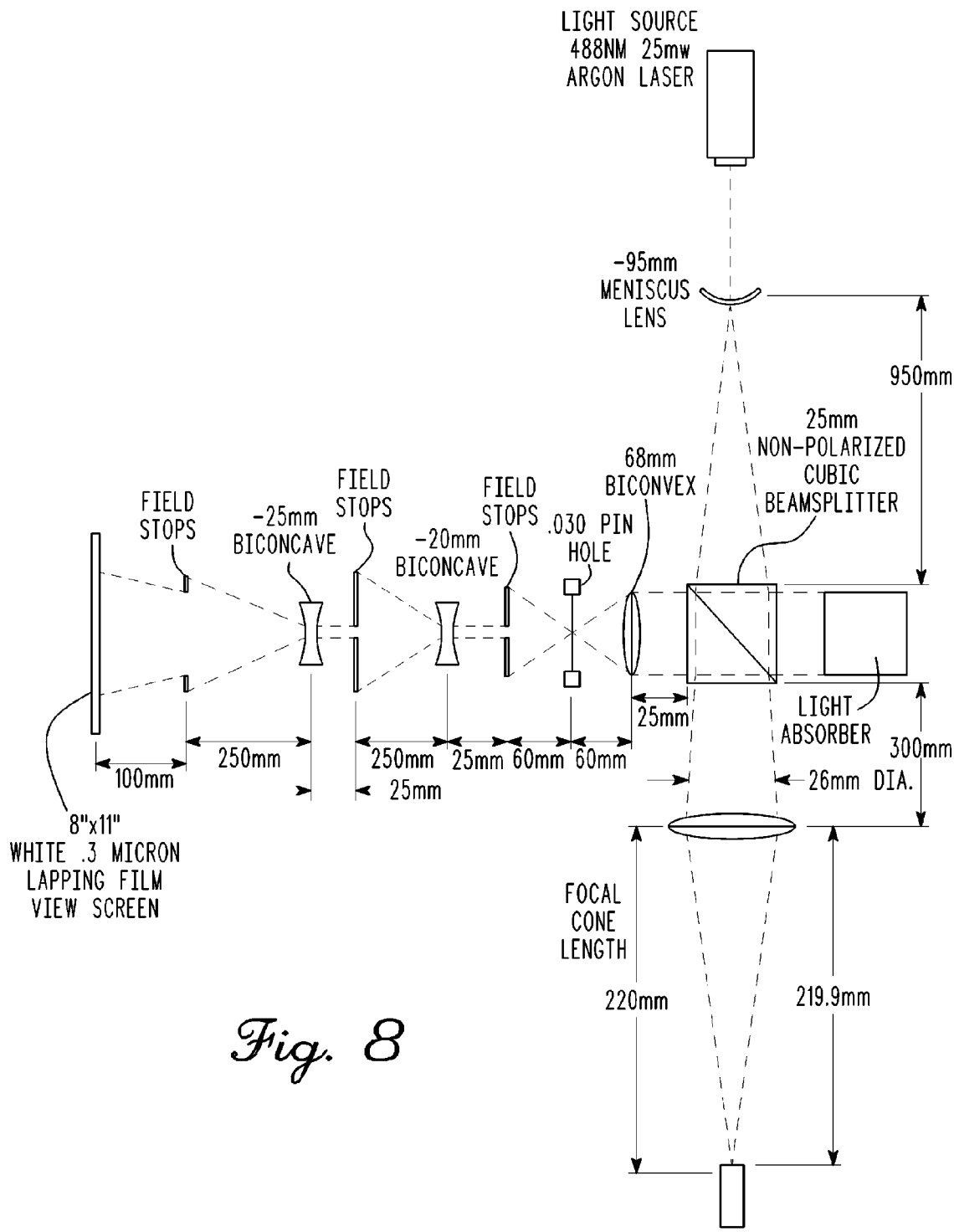
FIG. 8 is a schematic view of a prototype embodiment of a microscope incorporating features of the present invention.

A prototype microscope was constructed in accordance with the basic dimensions shown on FIG. 8. As can be determined from an inspection of FIG. 8, the first optical element comprised a positive 200 mm by convex lens with a focal length of 220 mm. The sample was placed at a location 219.9 mm from the first optical element. Light from a 488 nanometer 25 milliwatt argon laser was focused onto the specimen through a 25 mm non-polarized cubic beam splitter. Light reflected off the specimen passed through a second optical element which comprised a 68 mm by convex lens located 25 mm from the beam splitter. The primary stage field stop comprised a pinhole aperture 0.030 inches in diameter located 60 mm from the second optical element. The secondary magnification stage consisted of a −20 mm biconcave lens and a −25 mm biconcave lens with associated field stops which projected the final image onto a 0.3 micron lapping film view screen. The actual magnification of the apparatus shown in FIG. 8 was 5 million power.

Although certain illustrative embodiments and methods have been disclosed herein, it will be apparent from the foregoing disclosure to those skilled in the art that variations and modifications of such embodiments and methods may be made without departing from the invention. Accordingly, it is intended that the invention should be limited only to the extent required by the appended claims and the rules and principles of applicable law. Additionally, as used herein, references to direction such as "up" or "down" are intended to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater. Furthermore, and as used herein, a step of "providing" a structural element recited in a method claim means and includes obtaining, fabricating, purchasing, acquiring or otherwise gaining access to the structural element for performing the steps of the method.

What is claimed is:

1. A method of producing a super-magnified image comprising:
   providing a wide-field optical microscope, said optical microscope comprising,
   (a) a source of radiation for illuminating a specimen,
   (b) means for supporting the specimen,
   (c) a primary magnification section comprising first and second optical means; said first optical means having a first focal point, said first optical means receiving and focusing radiation reflected from the specimen into collimated radiation, said second optical means having a second focal point, said second optical means receiving said collimated radiation and focusing said collimated radiation to said second focal point, said first and second optical means defining a first optical axis;
   (d) a pinhole aperture positioned at the second focal point for blocking transmission of a portion of said radiation that is not parallel to said first optical axis;
   (e) a secondary magnification section comprising a field stop element and a third optical means, said field stop comprising a second aperture having a predetermined area, said second aperture operating to block transmission of a portion of said radiation falling outside the predetermined area, said third optical means comprising a negative optical element receiving a transmitted portion of said radiation from said field stop, said third optical means acting to increase divergence of said transmitted portion of said radiation to produce a super-magnified image; and
   (f) display means for displaying said super-magnified image;
   supporting said specimen at a location along the first optical axis that is closer to said first optical means than said first focal point; and
   illuminating said specimen with said source of radiation to produce a super-magnified image on said display means.

2. The method of claim 1, wherein:
said first optical means comprises a lens.

3. The method of claim 1, wherein:
said first optical means comprises a reflector.

4. The method of claim 1, wherein:
said first optical means comprises an off axis parabolic reflector.

5. The method of claim 1, wherein:
said display means comprises an eyepiece.

6. The method of claim 1, wherein:
said display means comprises a view screen.

7. The method of claim 1, further comprising:
moving said specimen along said optical axis in a direction away from said first optical means to increase magnification of said super-magnified image.

8. The method of claim 1, wherein:
said optical microscope further comprises a non-polarized beam splitter disposed in an optical path between said source of radiation and said first optical means.

* * * * *